3,531,459
MONOAZO-DYESTUFFS CONTAINING FIBER-RE-
ACTIVE AND WATER SOLUBILIZING RADICALS
Max Eugene Chiddix and Harlan B. Freyermuth, Easton,
Pa., assignors to General Aniline & Film Corporation,
New York, N.Y., a corporation of Delaware
No Drawing. Filed Dec. 2, 1964, Ser. No. 415,506
Int. Cl. C09b *29/22;* D06p *1/02*
U.S. Cl. 260—163                                 7 Claims

ABSTRACT OF THE DISCLOSURE

An azo, anthraquinone or phthalocyanine dyestuff devoid of nuclearly substituted sulfonic and carboxylic acid groups and containing 1 to 4 nuclearly substituted fiber-reactive radicals which in free acid form have the formula —$(CH_2)_n$—$SO_2CH_2CH_2$—X and 1 to 4 nuclearly substituted water-solubilizing radicals which in free acid form have the formula —$(Y)_p$—$(CH_2)_m$—X wherein X is sulfato, phosphato, or sulfobenzenesulfonyloxy, Y is —NZ—, $SO_2NZ$—, or —O—, Z is —H or —$(CH_2)_m$—X, $n$ and $p$ each has a value of 0 or 1, and $m$ is an integer of 2 to 3, said dyestuffs being reactive with fibrous materials when applied under acid binding conditions.

---

This invention relates to a novel fiber-coloring process and a novel group of chromophoric compounds or dyestuffs useful in such process.

A number of dyeing processes are known in which dyeings of improved fastness properties are obtained by reaction between the dyestuff and the fiber. Among the large number of types of fiber-reactive dyestuffs proposed for use in such processes, only a few are commercially available. Among these are the dyestuffs of the sulfatoethylsulfone or vinylsulfone type. Because of the relative scarcity of such dyestuffs and/or their substantial unavailability to large sections of the dyeing trade and/or various disadvantages inherent in their production or use with respect to procedure, cost, and/or results obtained, there exists a definite need in the industry for new and improved types of reactive dyestuffs and/or methods of using the same.

One of the principal disadvantages attributable to fiber-reactive dyestuffs of the above mentioned type resides in the difficulty of attainment of adequate solubility both to facilitate application of the dyestuff to the fiber with which it is to be reacted and to aid in the removal of any dyestuff which has not reacted with the fiber by washing. While these dyestuffs have reasonably good solubility characteristics by reason of the ester groups therein, under the conditions suitable for carrying out the desired reaction between the dyestuff and the fiber, subsequent decomposition and hydrolysis of the fiber-reactive ester groups take place. Those dyestuff molecules which have not reacted with the fiber are accordingly no longer water soluble by reason of the removal of the ester groups therefrom and are therefore not readily removed from the dyed fiber by washing. One the other hand they are not sufficiently well bonded to the fiber to avoid the serious handicap of poor crock fastness. In addition such loosely held dyestuff contributes greatly to the likelihood of dullness and irregularity of application resulting from possible crystallization on or within the fiber. While the obvious expedient of sulfonation of the fundamental dyestuff molecule has been resorted to in order to impart improved solubility including the necessary solubility to permit removal of unreacted dyestuff from the dyed fiber by washing, such expedient usually results in a change of shade and, in some cases, increased dullness.

It is an object of this invention to provide a novel group of water soluble organic dyestuffs which will not be subject to one or more of the above disadvantages. Another object of this invention is the provision of a process for coloring fibers with such dyestuffs. Other objects and advantages will appear as the description proceeds.

The attainment of the above objects is made possible by this invention which is based upon the discovery and provision of an organic dyestuff devoid of nuclearly substituted sulfonic and carboxylic acid groups and containing at least one nuclearly substituted fiber-reactive radical of the formula

and at least one nuclearly substituted water-solubilizing radical of the formula

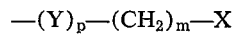

wherein

X is selected from the group consisting of sulfato, phosphato, and sulfobenzenesulfonyloxy,
Y is selected from the group consisting of —NZ—, —$SO_2NZ$—, and —O—,
Z is selected from the group consisting of —H and —$(CH_2)_m$—X,
$n$ and $p$ each has a value of 0 or 1, and
$m$ is an integer of 2 to 3.

It will be understood that one or both of the hydrogen atoms in any of the methylene groups in either of the radicals referred to above may be replaced by inert substituents including lower alkyl such as methyl, ethyl and propyl, cycloalkyl such as cyclohexyl, and aryl such as phenyl and naphthyl groups.

It has been found that dyestuffs of the above formula are readily and economically manufactured, relatively speaking, and are readily applied to fibers containing a reactive or labile hydrogen atom from an aqueous medium under acid binding conditions by dyeing or printing for the production of dyeings and prints having improved fastness properties including resistance to wet treatments and resistance to crocking. Although the invention includes dyestuffs containing from 1 to 4 of each of the above defined fiber-reactive and water solubilizing radicals, further improved fiber-reactivity, fastness properties, and solubility properties are attained when the dyestuffs contain a plurality, preferably 2, of each of these radicals. Optimally the two fiber-reactive groups are substituted in the same nucleus or benzene ring, preferably in meta position relative to each other, whereby increased fiber-reactivity and/or cross-linking effects are attained, the reactivity being apparently increased by this manner of substitution in a single nucleus. In general, increased fastness properties, apparently by a cross linking mechanism are attained when the dyestuffs of the invention contain a plurality of the defined fiber-reactive radical.

In general, the organic dyestuffs containing the above defined radicals may be of any known type of dyestuff or chromophoric compound. Although Venkataraman's "Chemistry of Synthetic Dyes," Academic Press, N.Y. 1952, volumes I and II discloses a multitude of such organic dyestuffs which may be provided with the above defined fiber-reactive and water solubilizing radicals including azo, quinoid, indigoid, thioindigoid, di- and tri-arylmethane, and -amine, xanthene, acridine, azine, oxazine, thiazine, stilbene, sulfur, and phthalocyanine dyestuffs, the present invention will be described hereafter with respect to a preferred group of dyestuffs including azo, anthraquinone and phthalocyanine dyestuffs.

The above defined fiber-reactive and water-solubilizing radicals may be nuclearly bonded to the dyestuff or to a precursor thereof in any desired manner, as for example by esterification, preferably simultaneously, of the dyestuff or dyestuff precursor containing at least one nuclearly substituted group of the formula (1)    $—(CH_2)_n—SO_2CH_2CH_2—OH$ and at least one nuclearly substituted group of the formula (2)    $—(Y)_p—(CH_2)_m—OH$ wherein Y, $n$, $p$, and $m$ have the values given above (X in Z is also OH), with sulfuric acid, phosphoric acid, or benzene or toluene di- or tri-sulfonylchloride or there equivalents, to substitute the OH group in each of these radicals of Formulae 1 and 2 by X, i.e. sulfato, phosphato, or sulfobenzenesulfonyloxy.

Nuclear insertion of groups of the Formula 1 above wherein $n$ is 1 may be carried out by chloromethylation of the dyestuff or dyestuff precursor, reaction of the chloromethylated intermediate with mercaptoethanol, and oxidation of the thio link in the resulting intermediate to the corresponding sulfone by reaction with hydrogen peroxide, preferably in the presence of a tungstic acid compound. Insertion of similar groups wherein $n$ is 0, i.e. hydroxyethylsulfone groups, may be effected by converting the dyestuff or dyestuff precursor into sulfinic acid or its sodium salt, and then reacting this intermediate with β-chloroethyl alcohol or ethyleneoxide. Another method of inserting the latter group is by reaction of a dyestuff or dyestuff precursor containing a mercapto group (SH) with β-chloroethyl alcohol or ethyleneoxide followed by oxidation of the thio linkage in the resulting intermediate to the corresponding sulfone in the manner described above.

Groups of the Formula 2 above may be inserted by reaction of a dyestuff or dyestuff precursor containing an NH₂ group with 1 or 2 moles of β-chloroethyl or β-chloropropyl alcohol, ethyleneoxide or 1,3-propyleneoxide for each such group, or containing an SO₂Cl group with mono- or di-ethanol- or -propanolamine, or containing an OH group with β-chloroethyl or β-chloropropyl alcohol, ethyleneoxide or 1,3-propyleneoxide. Dyestuffs and dyestuff precursors containing a group of the Formula 2 above wherein $p$ is 0, i.e. a nuclearly substituted hydroxyethyl or hydroxypropyl group, are also known.

The fiber-reactive dyestuffs of the present invention are highly effective for coloring natural and synthetic fibers, particularly cellulosic textile fibers, in any desired shades of good to excellent fastness properties. The coloring process involves dyeing (including printing) the fibrous material by application thereto under acid binding conditions of an aqueous medium containing at least one of the above-defined dyestuffs of the invention at any temperature ranging from ambient temperatures to the boiling point of the medium. The medium may have a pH ranging from about 4 to 14 although generally neutral to alkaline conditions are preferred. It will be understood that as employed herein, the term "aqueous medium" is intended to include preferred aqueous solutions in addition to dispersions or stable colloidal suspensions of the reactive dyestuff, properly thickened in known manner when employed in a printing process. The aqueous medium may be applied by immersion, jig dyeing, padding, spraying, printing, or in any other desired manner.

Although aqueous media are disclosed and claimed in the present process, it will be understood that this is only the preferred embodiment and that the water in the aqueous medium may be replaced in whole or in part by a water miscible, polar organic solvent such as acetone, alcohol, dioxazine, dimethylformamide, or the like without departing from the scope of this invention. It will be likewise understood that the medium containing the reactive dyestuffs of the present invention may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen containing compounds as higher molecular weight alcohols, phenols, fatty acids and the like, buffering agents such as mixtures of monosodium and disodium or potassium phosphates or arylsulfonamides, and protective colloids and thickening agents for the production of printing pastes such as methyl cellulose, starch, gum arabic, gum tragacanth, locust bean gum, sodium alginate, and the like.

The reaction between the reactive dyestuff and the fiber containing a reactive hydrogen atom involves liberation of acid HX and the reaction is accordingly favored by acid binding conditions. As acid binding agents which may be added to the medium containing the reactive dyestuff or applied to the fiber prior or subsequent thereto, there may be mentioned generally alkali metal (sodium, potassium, lithium, etc.) hydroxide, carbonate, bicarbonate, phosphate, silicate, borate, acetate or the like, or an organic base such as triethanolamine or other tertiary amines as disclosed for example in U.S. 3,116,103, in an amount sufficient to neutralize the liberated HX in whole or in part. Such amount may range from less than 0.5% up to 10% or more based on the weight of the aqueous medium containing the reactive dyestuff. Instead of the above mentioned acid binding agents, a substance may be employed which liberates an acid binding agent upon subsequent subjection to elevated temperatures. An example of such a substance is sodium trichloroacetate, and the use of such a substance requires subsequent application of elevated temperatures such as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene packaging film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 10 minutes or less to several hours or more. Usually, the fiber is continuously padded with the fiber-treating medium containing the chromophoric compound, squeezed to, for example, a 50 to 200% liquor pickup, dried and heated at 90 to 350° C. for an hour or more to 30 seconds or less, followed by washing and rinsing. A dry heat treatment may be substituted by a steaming or the like if desired.

The dyeing process of this invention is particularly effective for dyeing and printing cellulosic fibers of natural or synthetic type such as cotton, linen, wood, paper, regenerated cellulose and the like in any desired shades of good to excellent fastness properties. As a result of the reactive dyeing process of the invention, such dyed or printed fibers are bonded and in some instances cross linked to the fiber-reactive dyestuffs of the invention through the depicted terminal —CH₂CH₂— groups with liberation of the terminal X radicals from such groups and the reactive hydrogen atoms (for example in the OH groups in cellulose) in the fiber. As pointed out above, the cross linking reaction leading to enhanced fastness properties and the like is favored and/or accelerated by reason of the described double substitution of the fiber-reactive groups in the same nucleus, particularly in the meta positions in the depicted benzene ring.

In addition to cellulose and its derivatives, the invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRH, etc. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano or amide linear or side groups, polyvinyl alcohol, partially hydrolyzed cellulose acetate and polyvinyl acetate, polyvinyl choride, and mixtures, copolymers and graft copolymers thereof. Mixed fabrics and fibers may be similarly treated, and concurrent use of different fiber-reactive dyestuffs of the present invention can be made for the production of novel and improved effects in any manner desired.

The fibers may be in any of the usual forms and in natural bulk, interwoven, knitted or felted form as for example in the form of staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention, and the fundamental concepts and teachings thereof.

The following examples are only illustrative of the present invention are are not to be regarded as limitative. All parts and proportions referred to herein and in the appended claims are by weight unless otherwise indicated.

Example 1

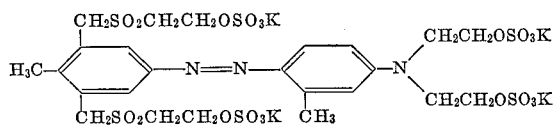

(a) 17.6 g. of 5-amino-2-methyl-m-xylylene-$\alpha^1,\alpha^3$-bis-(2-sulfonylethanol) are dissolved in 150 ml. water and 13 ml. concentrated hydrochloric acid e.g. 1.188. The amine hydrochloride solution is cooled to 0–5° C. and diazotized by a dropwise addition, while stirring, of 36 ml. of a 10% weight/volume sodium nitrite solution. After one-half hour stirring at 0–5° C. the excess nitrous acid is destroyed by the addition of 10 ml. of a 10% solution of sulfamic acid giving a negative test with potassium starch iodide paper.

A coupler solution is made up by dissolving 11.4 g. 2,2′-(m-tolylimino)diethanol in 200 ml. water and 100 ml. pyridine. 10 ml. of 20% weight/volume solution of sodium carbonate are added. The cold diazo solution is then added to the coupler solution in less than two minutes. The pH is 6.6. An additional 10 ml. of 20% sodium carbonate are added, pH 6.7. The reaction mixture is stirred at room temperature for 3 hours, after which time it gives a negative test for diazo with H acid. Dilution of the coupling mixture with 1600 ml. water completely precipitates the azo dye. The product is filtered on a Buchner funnel and dried in a vacuum oven at 50° C. The weight of the ethanol dyestuff derivative is 28.1 g. Ten grams of this dye are dissolved in 70 g. 96% sulfuric acid at room temperature with stirring. Stirring is continued at room temperature over night and the next morning, the sulfuric acid solution of the sulfate ester of the dyestuff is drowned into 500 g. ice. The dyestuff of the above formula is precipitated by the addition of 60 g. of potassium chloride. The mixture is stirred for 3 hours and filtered on a Buchner. The wet cake is slurried in 200 ml. saturated potassium chloride solution and with stirring, the residual acid from the cake is neutralized by a gradual addition of 20.5 g. sodium bicarbonate at pH 6.7. The sulfate ester derivative of dyestuff is filtered on a Buchner funnel and dried in a vacuum oven at 50° C. by this procedure 40.25 g. of the desired fiber-reactive dyestuff are obtained.

Substitution of the 2,2 - (m-tolylimino)diethanol by equivalent amounts of the corresponding ethanol or dipropanol compound yields dyes wherein the righthand solubilizing group is —NHCH$_2$CH$_2$OSO$_3$K or

—N=(CH$_2$CH$_2$CH$_2$OSO$_3$K)$_2$

The ester salts shown in these examples are to be considered equivalent to the free acid ester forms of the dyestuffs.

(b) An aqueous dye bath is prepared containing, per gallon, 3 ounces of any of the above dyestuffs, 3 ounces of sodium carbonate and 1 ounce of urea. This dye bath is padded on cotton piece goods, the squeeze roll of the padder being adjusted for a 70% wet pick-up based on the weight of the fabric. The padded cloth is dried, heat cured for 3 minutes at 310° F., soaped at the boil for 5 minutes in the presence of a small amount of nonionic detergent, rinsed and dried. A bright orange dyeing is obtained having excellent wash fastness properties.

Example 2

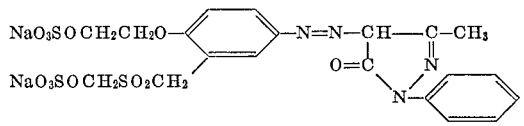

(a) The above dyestuff is prepared by coupling diazotized 2-($\beta$-hydroxyethoxy)-5-aminobenzyl-$\alpha$-(2-sulfonylethanol) with 3-methyl-1-phenyl-2-pyrazolin-5-one and treating the resulting derivative of the above formula.

(b) When applied to cotton fabric as described in Example 1(b), a bright yellow dyeing is obtained with similar fastness properties.

Example 3

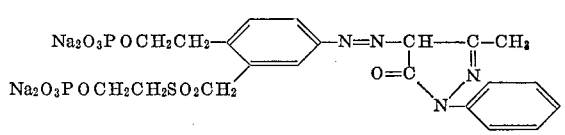

(a) The above dyestuff is prepared by coupling diazotized 2 - ($\beta$-hydroxyethyl)-5-aminobenzyl-$\alpha'$-(2-sulfonylethanol) with 3-methyl-1-phenyl-2-pyrazolin-5-one and treating the resulting azo dyestuff with 5% phospholeum (P$_2$O$_5$ dissolved in phosphoric acid) to form the corresponding phosphate ester derivative having the above formula.

(b) When applied to cotton fabric as described in Example 1(b) a bright yellow dyeing is obtained having similar fastness properties.

Example 4

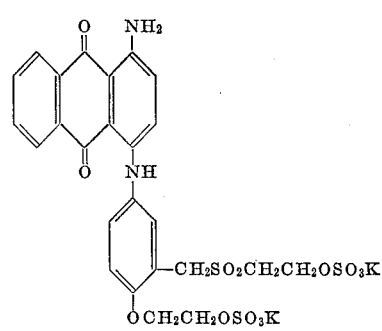

(a) The above dyestuff is prepared by reacting 2-(β-hydroxyethoxy) - 5 - aminobenzyl-α'-(2-sulfonylethanol) with 1-amino-4-bromoanthraquinone and treating the resulting anthraquinone dyestuff with 96% sulfuric acid to form the sulfate ester derivative of the above formula.

(b) When applied to cotton fabric as described in Example 1(b), a bright blue dyeing is obtained with similar fastness properties.

Example 5

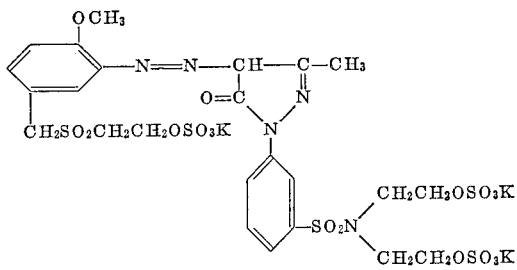

(a) The above dyestuff is prepared by coupling diazotized 3 - amino-4-methoxybenzyl-α'-(2-sulfonylethanol) with m - (3 - methyl - 5-oxo-2-pyrazolin-1-yl)-benzenesulfonyl-2,2'-iminodiethanol and treating the resulting azo dyestuff with 96% sulfuric acid to form the sulfate ester derivative of the above formula.

(b) When applied to cotton fabric as described in Example 1(b), a bright yellow dyeing is obtained with similar fastness properties.

EXAMPLE 6

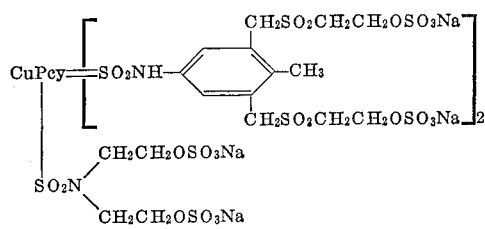

(a) The above dyestuff, in which CuPcy signifies the fundamental copper phthalocyanine molecule, is prepared by condensation of 1 mole of copper phthalocyanine containing an average of about 3 nuclearly substituted sulfonylchloride groups with 2 moles of 5 - amino - 2 - methyl - m-xylylene-α¹,α³-bis-(2-sulfonylethanol) and 1 mole of diethanolamine and treating the resulting phthalocyanine dyestuff with 96% sulfuric acid to form the sulfate ester derivative of the above formula.

When the diethanolamine in the above procedure is substituted by an equivalent amount of ethanolamine or dipropanolamine, the lower, unbracketed, water solubilizing group in the above formula is substituted by

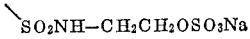

or

When the 96% sulfuric acid used in the above procedure as esterifying agent is substituted by benzenedisulfonylchloride, the corresponding sulfobenzenesulfonyloxy ester of the dyestuff is formed, i.e. the sulfato groups in the formula are substituted by

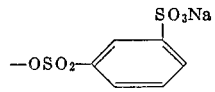

It will be seen that one of the sulfonylchloride groups in the esterifying agent reacts with the terminal hydroxyl groups of the dyestuff and the remaining sulfonylchloride group hydrolyzes to a sulfonic acid group.

(b) When any of the above dyestuffs are applied to cotton fabric as described in Example 1(b), bright turquoise dyeings are obtained with highly improved fastness properties.

Example 7

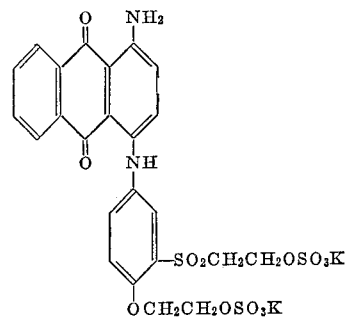

(a) The above dyestuff is prepared by reacting 1-amino-4-bromoanthraquinone with 2-(β-hydroxyethoxy)-5-aminophenyl-2-sulfonylethanol and treating the resulting anthraquinone dyestuff with 96% sulfuric acid to form the sulfate ester derivative of the above formula.

(b) When applied to cotton fabric as described in Example 1(b), a bright blue dyeing is obtained with similar fastness properties.

Example 8

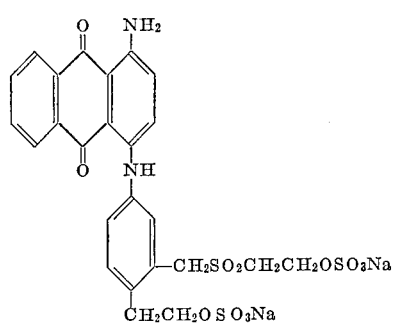

(a) The above dyestuff is prepared by reacting 1-amino-4-bromoanthraquinone with 2-(β-hydroxyethyl)-5-aminobenzyl-α'-(2-sulfonylethanol), treating the resulting anthraquinone dyestuff with 96% sulfuric acid and salting out with sodium chloride to form the sulfate ester derivative of the above formula.

(b) When applied to cotton fabric as described in Example 1(b), a bright blue dyeing is obtained with similar fastness properties.

Example 9

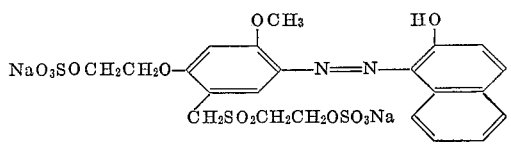

(a) The above dyestuff is prepared by coupling diazotized 2-(β-hydroxyethoxy)-4-methoxy - 5 - aminobenzyl-α¹-(2-sulfonylethanol) with β-naphthol and treating the resulting azo dyestuff with 96% sulfuric acid to form the sulfate ester derivative of the above formula.

(b) When applied to cotton as described in Example 1(b), a bright orange dyeing is obtained with similar fastness properties.

Example 10

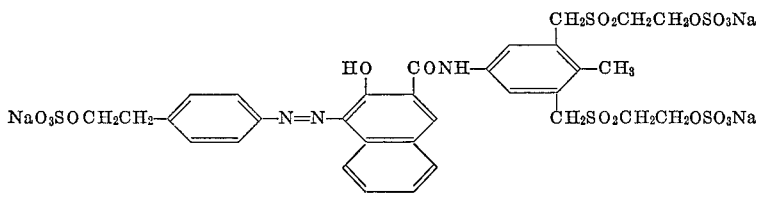

(a) The above dyestuff is prepared by coupling diazotized 2-(p-aminophenyl)ethanol with the naphthol derivative obtained by condensing 3-hydroxy-2-naphthoic acid with 5 - amino - 2 - methyl-m-xylylene-α1,α3-bis-(2-sulfonylethanol) and treating the resulting azo dyestuff with 96% sulfuric acid to form the sulfate ester derivative of the above formula.

(b) When applied to cotton fabric as described in Example 1(b), a bright red dyeing is obtained with improved fastness properties.

The procedures described in the foregoing examples also yield dyeings with improved fastness properties when employed for dyeing other reactive or labile hydrogen containing fibers described above.

What is claimed is:

1. A monoazo dyestuff devoid of nuclearly substituted sulfonic and carboxylic acid groups and containing 1 to 2 phenyl substituted fiber-reactive radicals which have the formula —(CH$_2$)$_n$—SO$_2$CH$_2$CH$_2$—X and 1 to 2 phenyl substituted water-solubilizing radicals which have the formula —(Y)$_p$—(CH$_2$)$_m$—X wherein
   X is selected from the group consisting of sulfato, phosphato, and sulfobenzenesulfonyloxy,
   Y is selected from the group consisting of —NZ—, —SO$_2$NZ—, and —O—,
   Z is selected from the group consisting of —H and —(CH$_2$)$_m$—X,
   n and p each has a value of 0 or 1, and
   m is an integer of 2 to 3.

2. A dyestuff as defined in claim 1 having the formula

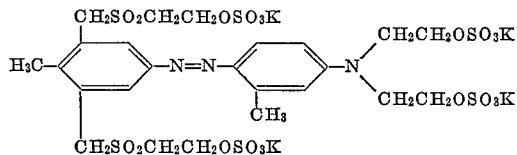

3. A dyestuff as defined in claim 1 having the formula

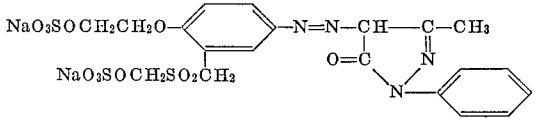

4. A dyestuff as defined in claim 1 having the formula

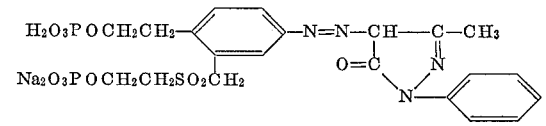

5. A dyestuff as defined in claim 1 having the formula

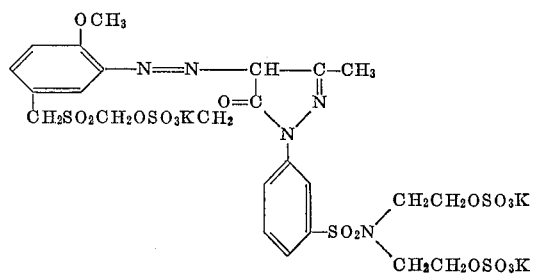

6. A dyestuff as defined in claim 1 having the formula

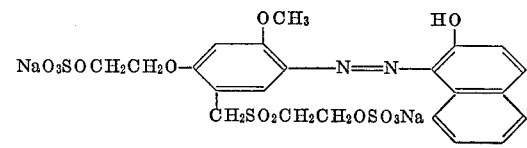

7. A dyestuff as defined in claim 1 having the formula

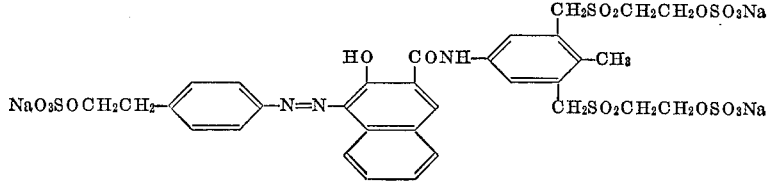

References Cited

UNITED STATES PATENTS

| | | | |
|---|---|---|---|
| 2,128,256 | 8/1938 | Krzikalla et al. | 260—200 |
| 3,313,799 | 4/1967 | Noll | 260—160 |

FOREIGN PATENTS

| | | |
|---|---|---|
| 337,593 | 5/1959 | Switzerland. |

CHARLES B. PARKER, Primary Examiner
D. M. PAPUGA, Assistant Examiner

U.S. Cl. X.R.

8—6.5, 7, 41, 51, 55; 260—197, 203, 207.3, 314.5, 378